United States Patent Office 2,719,840
Patented Oct. 4, 1955

2,719,840

BIS-ANTHRAQUINONEAZOLES OF AZOBI-PHENYLDICARBOXYLIC ACID

Joseph Deinet, Glassboro, N. J., assignor to E. I. du Pont de Nemours and Company, Wilmington, Del., a corporation of Delaware No Drawing. Application July 9, 1951,
Serial No. 235,894

6 Claims. (Cl. 260—157)

This invention relates to the preparation of new and valuable vat dyes which are mono- and disulfonic acid compounds of bis-anthraquinoneazoles of azobiphenyldicarboxylic acid. These compounds, which are oxazoles, thiazoles, imidazoles, or mixed azole compounds, are mono- or disulfo compounds of the following general formula:

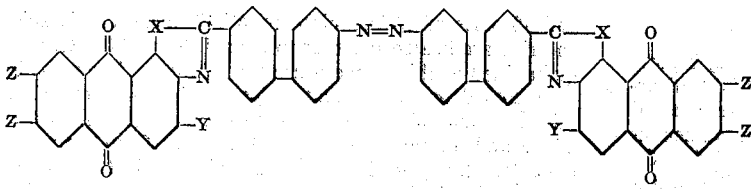

in which X stands for an element of the group consisting of O, S and NH; at least one of the anthraquinone nuclei contains not more than one sulfo group in one of the positions Y and Z, which sulfo group is of the formula —SO₃M in which M stands for hydrogen or an alkali metal, more particularly sodium or potassium; and in which one of the remaining positions Y and Z in each of the anthraquinone nuclei stands for an element of the group consisting of —H or halogen, more particularly —Cl and —Br, and the remaining positions Y and Z stand for hydrogen.

In the anthraquinone class of dyes it has been recognized that those in the yellow range are generally deficient in fastness properties, more particularly with regard to fastness to light. Where yellow dyes have been found in the anthraquinone series which have good fastness properties, they are usually dull or weak tinctorially and in general are not adapted for printing by the methods usually employed in the printing of vat dyes, and it has been necessary to select various dyes of the anthraquinone vat dye class, bearing in mind the need for fastness, brightness, tinctorial strength or application properties required for the particular need at hand.

In U. S. Patent 2,175,803 a group of symmetrical di-anthraquinone diazoles which contain an azo group in the molecule are disclosed which dye vegetable fibers in yellow shades which are said to exhibit good fastness to chlorine and boiling soap solution and, in certain cases, to light. It has been found, however, that these dyes are deficient in wet fastness, particularly in kier boiling and vat stability, and are in general not suitable for use as printing colors.

It is an object of the present invention to produce new and valuable anthraquinone vat dyes which are particularly suitable for producing fast yellow shades when applied to textiles by the usual vat dye printing processes. It is a further object of the invention to produce desirable fast yellow dyes in the anthraquinone vat dye series from readily available halogenaminoanthraquinone sulfonic acids; mercaptoaminoanthraquinone sulfonic acids or diaminoanthraquinone sulfonic acids and their halogen derivatives. It is a still further object of the invention to prepare mono- or disulfonic acid derivatives of bis-anthraquinone oxazoles, thiazoles or imidazoles of azobiphenyldicarboxylic acids which carry at least one sulfonic acid group in a beta position on at least one of the anthraquinone nuclei.

The azole compounds of this invention are prepared by the general procedures usually employed in the preparation of azole compounds from appropriately substituted aminoanthraquinones and carboxylic acids. In general, the condensation of the substituted animoanthraquinone with the carboxylic acid is carried out in a non-reactive organic medium such as nitrobenzene, halogenated benzene, nitrotoluenes, naphthalene, the di- and tri-chlorobenzenes, and similar organic solvents, preferably in the presence of an organic base such as pyridine, quinoline, dimethyl aniline, etc.

The bis-oxazoles are preferably prepared by condensing a halogenated aminoanthraquinone-beta-sulfonic acid with 4,4'-azobiphenyl-4'',4'''-dicarboxylic acid in substantially equal molecular ratio at temperatures of from 120° to 200° C. The resulting mono-condensation product is then further condensed with an aminohalogenanthraquinone or with an aminohalogenanthraquinone sulfonic acid and then ring closed to the bis-oxazole.

Thiazoles are preferably prepared by a similar method, starting with the mercaptoaminoanthraquinone-beta-sulfonic acid, while the imidazoles are prepared by condensing an ortho-diaminoanthraquinone-beta-sulfonic acid with the azobiphenyldicarboxylic acid chloride.

Mixed types as illustrated by the following examples, such as the oxazole-thiazoles, oxazole-imidazoles, etc., can be readily prepared by first condensing an ortho-halogenaminoanthraquinone with the azobiphenyldicarboxylic acid chloride in substantially equal molecular amounts and then condensing the resulting product with a mercaptoaminoanthraquinone or a 1,2-diaminoanthraquinone, at least one of the aminoanthraquinone compounds of course carrying a sulfonic acid group. The resulting compounds are then ring closed to produce the azole rings. In the case of the thiazoles and imidazoles, ring closure to the azole group generally takes place during the condensation reaction, while the oxazole ring is usually formed by further reaction in the presence of condensation agents such as copper salts and acid binding agents.

The following examples are given to illustrate the invention. The parts used are by weight.

*Example 1*

Twelve hundred (1200) parts of nitrobenzene, 55 parts of 4,4'-azobiphenyl-4'',4'''-dicarboxylic acid (sodium salt), 2 parts of pyridine and 43 parts of thionyl chloride are agitated together while heating to from 98° to 100° C., and the reaction mixture is maintained at this temperature for from 15 to 20 hours. After cooling to 50° C. there are added 101 parts of 1-bromo-2-amino-anthraquinone-3-sulfonic acid (Na) fine powder. The mass is then heated to from 205° to 208° C. and maintained at this temperature for ¾ hour. After cooling to 120° C., 50 parts of sodium carbonate, 50 parts of potassium acetate, 1 part of cupric acetate and 1 part of cuprous chloride are added. The mass is heated to 210° C. and maintained at this temperature for 2 hours. It is then cooled to 50° C., filtered, the filter cake washed with nitrobenzene, alcohol and water in turn, and dried. The product is then acid pasted by drowning into water a concentrated sulfuric acid solution of the color, thereafter filtering, washing acid free and purifying by bleaching with sodium hypochlorite. It forms a bright yellow paste and dyes and prints cotton or related fibers in strong bright yellow shades of excellent fastness properties. This dye, in the form of the sodium salt, has the formula:

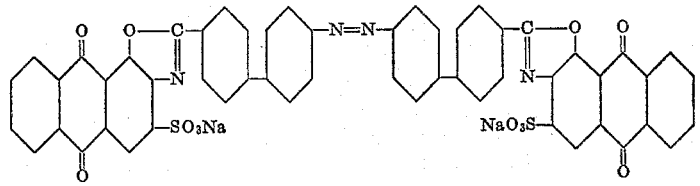

Example 2

Twelve hundred (1200) parts of nitrobenzene, 2 parts of pyridine, 50 parts of 4,4'-azobiphenyl-4'',4'''-dicarboxylic acid and 43 parts of thionyl chloride are agitated and heated to from 98° to 100° C. and maintained at this temperature for 20 hours. After cooling to 50° C., there are added 30.5 parts of 1-chloro-2-aminoanthraquinone. The reaction mass is then heated to from 138° to 140° C. and maintained at this temperature for 6 hours. The mass is then cooled to 25° C. and 50 parts of 1-bromo-2-aminoanthraquinone-3-sulfonic acid (K salt) fine powder are added, then heated to from 205° to 208° C. and maintained at this temperature for 1.5 hours. The mass is then cooled to 100° C. and 200 parts of nitrobenzene, 50 parts of sodium carbonate, 50 parts of potassium acetate, 1 part of cupric acetate and 1 part of cuprous chloride are added. The mass is then heated at 208° C. for 3.5 hours. It is then cooled to 50° C. and the mass filtered, the filter cake washed with alcohol and water, in turn, and dried. The product is then acid pasted and purified by bleaching with sodium hypochlorite. It forms a bright yellow paste and dyes and prints cotton in strong yellow shades of very good fastness.

The dye in the form of the sodium salt has the formula:

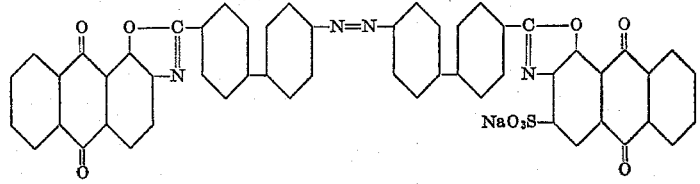

Example 3

Eight hundred (800) parts of nitrobenzene, 1 part of pyridine, 29 parts of 4,4'-azobiphenyl-4'',4'''-dicarboxylic acid chloride and 47 parts of 1-mercapto-(Na)-2-aminoanthraquinone-3-sulfonic acid (Na salt) fine powder are slowly heated together to 210° C. and maintained at this temperature for one-half hour. The mass is then cooled to 25° C., and filtered. The filter cake is washed with alcohol and water, in turn, and dried. The product is then acid pasted and purified by bleaching with sodium hypochlorite. It forms a bright orange-yellow paste and dyes and prints cotton in bright yellow shades of very good fastness.

The dye in the form of the sodium salt has the formula:

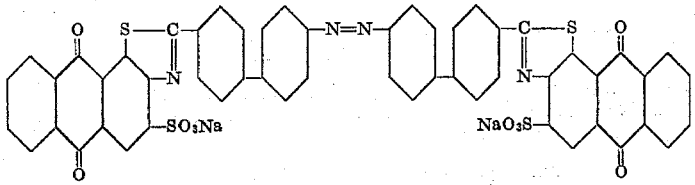

Example 4

Ten hundred (1000) parts of nitrobenzene, 1 part of pyridine, 25.7 parts of 1-chloro-2-aminoanthraquinone and 50 parts of 4,4'-azobiphenyl-4'',4'''-dicarboxylic acid chloride are heated together to from 138° to 140° C. and maintained at this temperature for 6 hours. The mass is then cooled to 25° C. and 38 parts of 1-mercapto (Na salt)-2-aminoanthraquinone-3-sulfonic acid (Na salt) are added and the mass stirred for ½ hour. Then the mass is heated slowly to 205° C. and maintained at this temperature for ½ hour. The mass is then cooled to 130° C. and 45 parts of sodium carbonate, 45 parts of potassium acetate, 1 part of cupric acetate and 1 part of cuprous chloride are added and the mass heated to from 205° to 208° C. and maintained at this temperature for 3 hours. The mass is then cooled to 50° C., filtered, the filter cake washed with alcohol and water, in turn, and dried. The product is then acid pasted and purified by bleaching with sodium hypochlorite. It forms a bright yellow paste and dyes and prints cotton or related fibers in bright yellow shades of very good fastness.

The dye in the form of the sodium salt has the formula:

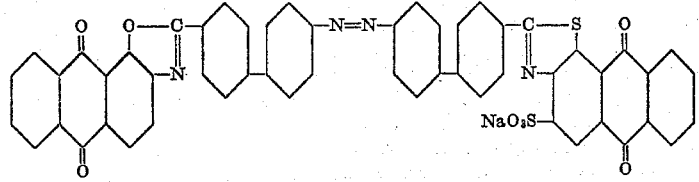

Example 5

Ten hundred (1000) parts of nitrobenzene, 2 parts of pyridine, 55 parts of 4,4'-azobiphenyl-4'',4'''-dicarboxylic acid (sodium salt) and 43 parts of thionyl chloride are agitated and heated together at 100° C. for 20 hours. Then 30.5 parts of 1-chloro-2-aminoanthraquinone are added and the mass is heated at 140° C. for 6 hours. The mass is then cooled to 50° C. and 40 parts of 1,2-diaminoanthraquinone-3-sulfonic acid (Na salt) fine powder are added and then heated to 208° C. and maintained at this temperature for 1.5 hours. The mass is then cooled to 25° C. and 50 parts of sodium carbonate, 50 parts of potassium acetate, 1 part of cupric acetate and 1 part of cuprous chloride are added. The reaction mass is then heated at 210° C. for 2 hours. After cooling to 50° C., the mass is filtered and the filter cake is washed with carbon tetrachloride. The filter cake is then steam distilled free from solvents, filtered and the filter cake washed alkali free and dried. The final product is then acid pasted and purified by bleaching with sodium hypochlorite. It forms a bright yellow paste and dyes and prints cotton in bright yellow shades of very good fastness.

The product in the form of the sodium salt has the formula:

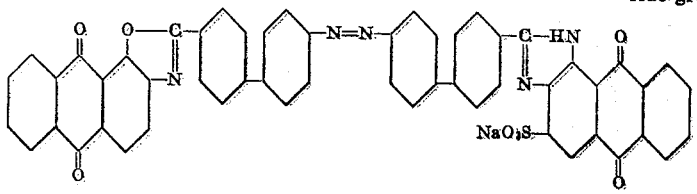

Example 6

Nine hundred (900) parts of nitrobenzene, 2 parts of pyridine, 43 parts of 4,4'-azobiphenyl-4'',4'''-dicarboxylic acid and 40 parts of thionyl chloride are heated together at 100° C. for 15 hours. After cooling to 25° C., 23.8 parts of 1,2-diaminoanthraquinone are added and the mass is heated at 170° C. for 1.5 hours. The mass is then cooled to 25° C. and 200 parts of nitrobenzene and 34 parts of 1,2-diaminoanthraquinone-3-sulfonic acid (Na salt) fine powder are added. The mass is then heated at 210° C. for 3 hours. After cooling to 50° C. the mass is filtered, the filter cake washed with alcohol and water in turn, and dried. The product is then acid pasted and purified by bleaching with sodium hypochlorite. It forms a bright yellow paste and dyes and prints cotton in bright yellow shades of good fastness. The product in the form of the sodium salt has the formula:

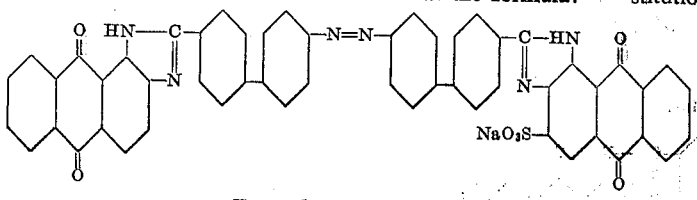

Example 7

Nine hundred (900) parts of nitrobenzene, 2 parts of pyridine, 43 parts of 4,4'-azobiphenyl-4'',4'''-dicarboxylic acid and 40 parts of thionyl chloride are heated together while agitating to 100° C. and maintained at this temperature for 20 hours. The mass is then air blown for 1 hour to remove excess of thionyl chloride. The mass is then cooled to 25° C. and a milled suspension of 40.5 parts of 1-bromo-2-aminoanthraquinone-3-sulfonic acid (sodium salt) and 200 parts of nitrobenzene are added and the reaction mass heated to 120° C. and maintained at this temperature for 6 hours. The mass is then cooled to 25° C. and a milled suspension of 27.7 parts of the sodium salt of 1-mercapto-2-aminoanthraquinone and 100 parts of nitrobenzene are added and the mass is then slowly heated to 138°-140° C. and maintained at this temperature for 1 hour. The mass is then cooled to 100° C. and 45 parts of sodium carbonate, 45 parts of potassium acetate, 1 part of cupric acetate and 1 part of cuprous chloride are added. The mass is then heated to 205° C. and maintained at this temperature for 2 hours. After cooling to 70° C. the reaction mass is filtered and the filter cake is washed with alcohol and water in turn, and dried. The product is then acid pasted and purified by bleaching with sodium hypochlorite in the presence of sodium hydroxide. It forms a bright yellow paste and dyes and prints cotton in bright yellow shades of good fastness properties.

The dye in the form of the sodium salt has the formula:

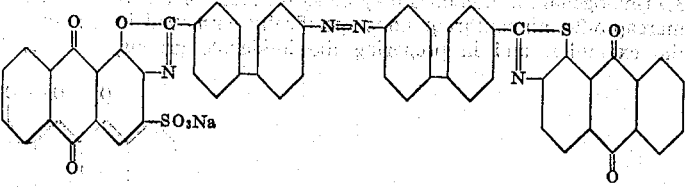

It will be apparent that in preparing the mixed azole compounds the thiazole or imidazole condensation may be first effected since this leaves the remaining acid chloride group as such and then the 1-halogen-2-aminoanthraquinone compound may be condensed and ring closed to the oxazole in place of carrying out the condensation in the specific order given in the above examples. It will also be apparent that in making the monosulfonic acid derivatives the condensation may be carried out in either order desired.

While the products in the above examples have been isolated as the alkali metal salts, it will be obvious to those skilled in the art that on acid pasting and drowning in water they may be recovered in the form of the free acid.

Because of the presence of the sulfonic acid group or groups in the dyes of this invention, these dyes may be prepared for application to the fiber by vatting without acid pasting as is often required with aminoanthraquinone vat dyes particularly with those of similar chemical constitution which do not contain the sulfonic acid group.

While anthraquinone vat dyes usually do not contain sulfonic acid groups, it has been found that the dyes of this particular series have improved application properties and vat stability due to the presence of the sulfonic acid groups and that they may be applied by the usual printing processes, whereas corresponding dyes not containing the sulfonic acid groups are not of commercial value for application to fibers by the usual printing processes.

The new compounds of this invention are yellow products which dye and print cotton or related fibers in yellow shades of excellent strength and fastness properties, particularly fastness to light.

While in the above examples the simple aminoanthraquinone compounds containing a sulfonic acid group are disclosed, there may be substituted in any of the above examples the corresponding halogen substituted compounds to produce dyes which contain halogen in the final molecule. For instance, in the preparation of the oxazole groups the 1,3-dibromo-2-aminoanthraquinone, the 1,3-dichloro-2-aminoanthraquinone or the mixed chloro-bromo-2-aminoanthraquinone compounds may be employed, including those carrying the sulfonic acid in the 6- or 7-positions, or the normally occurring mixture of the 1-halogen-2-aminoanthraquinone-6 (and 7)-sulfonic acid may be used. In the same manner, in preparing the thiazole group the 1-mercapto-2-amino-3,6 (or 3,7)-halogenanthraquinones may be substituted for the 1-mercapto-2-aminoanthraquinone specifically employed in the examples, and in preparing the imidazole groups, the 1,2-diamino-3-halogenanthraquinone or other halogen derivative may be used. The halogen compounds ordinarily employed will preferably be the chlorine and bromine derivatives, although other halogen derivatives may of course be substituted.

I claim:
1. Anthraquinone vat dyes of the general formula:

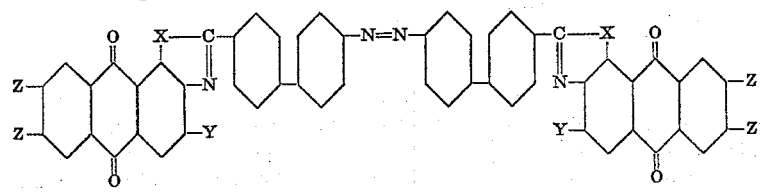

in which X stands for an element of the group consisting of O, S and NH; at least one of the anthraquinone nuclei contains not more than one sulfo group in one of the positions Y and Z, which sulfo group is of the formula —$SO_3M$ in which M stands for a member of the group consisting of hydrogen and an alkali metal; and in which one of the remaining positions Y and Z in each of the anthraquinone nuclei stands for an element of the group consisting of —H, —Cl and —Br, and the remaining positions Y and Z stand for hydrogen.

2. The anthraquinone vat dye of the formula:

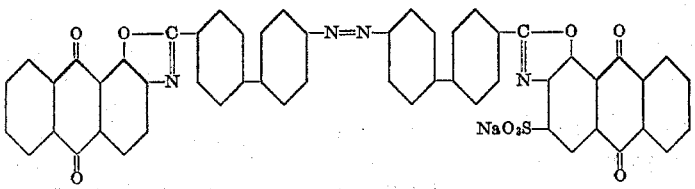

3. The anthraquinone vat dye of the formula:

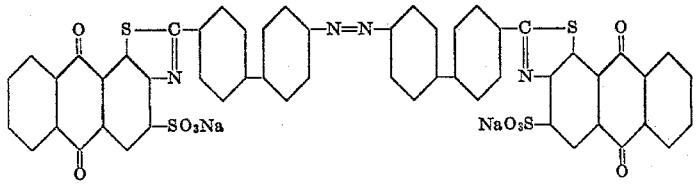

4. The anthraquinone vat dye of the following general formula:

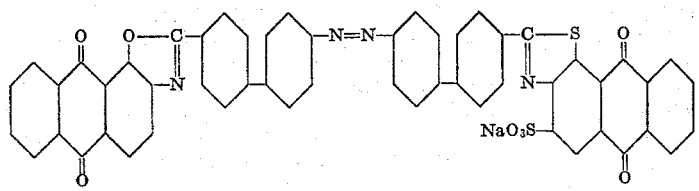

5. The anthraquinone vat dye of the formula:

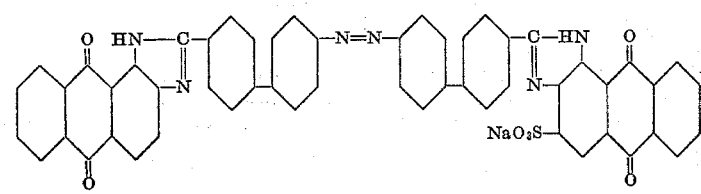

6. The anthraquinone vat dye of the formula:

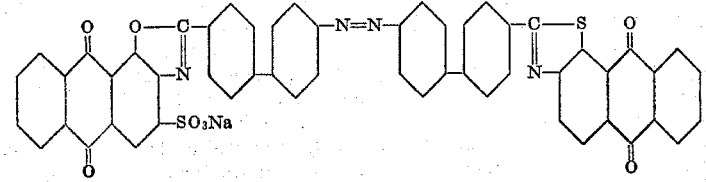

References Cited in the file of this patent
UNITED STATES PATENTS

| | | |
|---|---|---|
| 2,108,126 | Honold | Feb. 15, 1938 |
| 2,175,803 | Honold | Oct. 10, 1939 |

OTHER REFERENCES

Georgievics et al., "Dye Chemistry," 1920, pages 6 and 7.